Feb. 23, 1960 W. W. GLEASON 2,925,856
CUSHION FORMED OF FOAMED MATERIAL AND METAL MEMBERS
Filed April 15, 1958 2 Sheets-Sheet 1

INVENTOR.
William W. Gleason
BY
Ooms, McDougall, Williams & Hersh
Attorneys

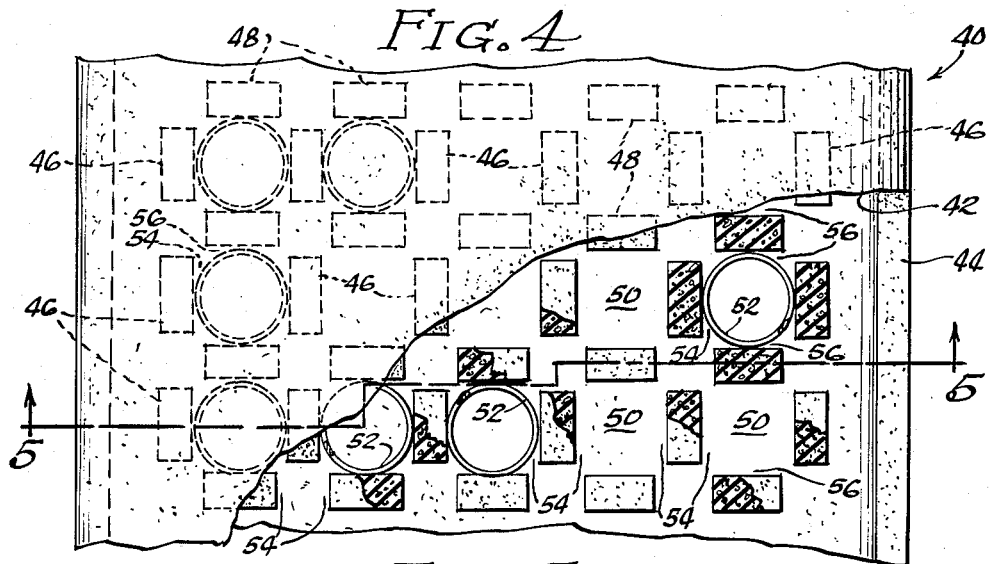
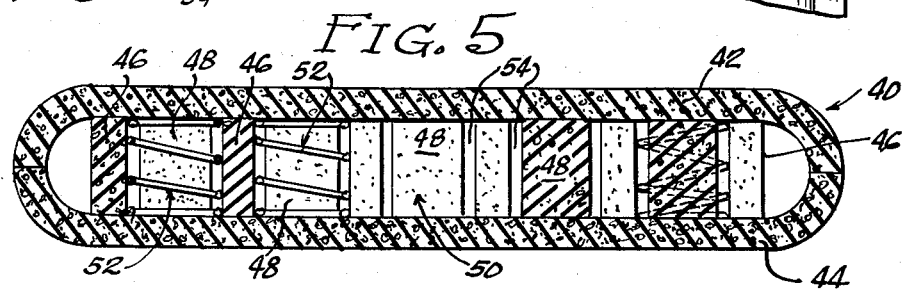
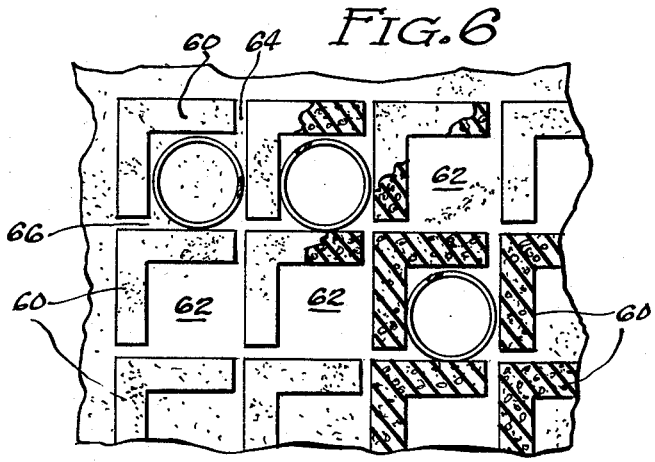

United States Patent Office 2,925,856
Patented Feb. 23, 1960

2,925,856

CUSHION FORMED OF FOAMED MATERIAL AND METAL MEMBERS

William W. Gleason, Chicago, Ill., assignor to Nachman Corporation, Chicago, Ill., a corporation of Illinois Application April 15, 1958, Serial No. 728,666

5 Claims. (Cl. 155—179)

This invention relates to a cushion, and it relates more particularly to a cushion formed of the combination of a foamed plastic or elastomeric material and individual metal spring members confined within the foamed resinous or elastomeric material.

Mattresses and cushions have been fabricated of foamed resinous and elastomeric materials because of the desirable characteristics of these materials in use as a cushion including softness, lightness, resiliency and good feel, and also including generally hygienic properties. Notwithstanding these and other attractive characteristics, one important barrier to the widespread adoption of foamed rubber or plastics as a cushioning material resides in the high cost of the raw materials to be foamed, and the problems embodying fabrication of the foamed structures and the development of sufficient support in the structure that is formed.

Attempts have been made to reduce the cost of the foamed cushioning material by coring the cushion to provide hollow spaces thereby to minimize the amount of material employed per unit volume. While the amount of material is reduced by such techniques to provide a proportional reduction in cost, the presence of the voids in the cushion makes itself felt in the lower stability and support provided by the cushion.

Thus, one of the objects of this invention resides in the fabrication of a cushion of foamed plastic or rubber materials having a high percentage of hollow spaces formed therein to permit reduction in the amount of foamed material employed, but which embodies means therein to compensate for the undesirable effects of the hollowed portions to provide a cushion having the resiliency and feel of a foamed cushion combined with support and resiliency of a spring metal cushion with reduced cost and without being able to detect the presence of the metal spring members.

The described characteristics are achieved by the combination wherein metal spring members are provided in the cored spaces within the foamed cushioning material, thereby to occupy the voids with a metal spring member of considerably lesser cost than the cushioning material replaced, while contributing spring action not available from the foamed cushioning material. Thus, a lower cost cushion is produced having all of the desirable characteristics of a cushion formed of a foamed plastic or rubber coupled with the desirable characteristics of springs formed of metal spring members, all of which are combined to form a cushion at less cost than a cushion formed of the foamed material alone.

The use of the combination of foamed rubber or plastic cored to receive separate spring metal members raises another problem with respect to the efficient and economical assembly of the metal spring members in the cored cushioning material of the foamed plastic or rubber.

For this purpose, techniques and devices have been developed for compressing the coil springs and removably mounting them on an elongate support in a spaced relation corresponding to the spaced relation between the aligned cores in the cushioning material. In this arrangement, the compressed coil springs are inserted with the support into the formed cushioning material of the foamed plastic or rubber for subsequent separation of the compressed coil springs from the support when in position to fill the openings provided in the interior of the structure. Thereafter, the support can be removed to leave the expanded coil springs as inserts in the cushion assembly.

This procedure for handling a plurality of coil springs can be employed for simultaneously inserting a plurality of such springs into the interior of the cushion housing. This procedure finds benefit in the application hereinafter to be described because the cushion housing can be designed for insertion of the spring members after the housing has been substantially completed, thereby to eliminate the difficult problem of forming the housing about the spring members while maintaining the spring members under a predetermined amount of compression.

Since the coil springs are maintained in a separated relation and under a tension condition within the housing, the cushion housing is fabricated to provide separate compartments for keeping the spring members in their proper relation and under a desirable tension within the housing. Because of the ability to effect a strong sealing relationship between elements formed of foamed rubber or plastics, a housing having the desired interior compartments can be formed of previously foamed strips of the plastic or rubber material, or else the housing can be molded to provide the desired construction during the foaming operation.

Thus it is a further object of this invention to provide a housing formed of a resilient, soft and flexible foamed material having compartments formed therein which are so shaped and dimensioned that individual coil springs can be conveniently inserted and retained therein after the housing has been completely or almost completely formed.

These and other objects of this invention will become more apparent when read in the light of the accompanying drawings and specifications wherein:

Fig. 4 is a plan view of another modification of the cushion with a portion of its top surface broken away to show the arrangement of its compartment forming strips and the individual coil springs inside;

Fig. 5 is a sectional view taken on the line 5—5 of Fig. 4 and looking in the direction indicated; and Fig. 6 is a portion of a plan view of a third modification of the cushion shown the arrangement of its compartment forming a strip with the individual coil springs mounted inside.

Figure 1:
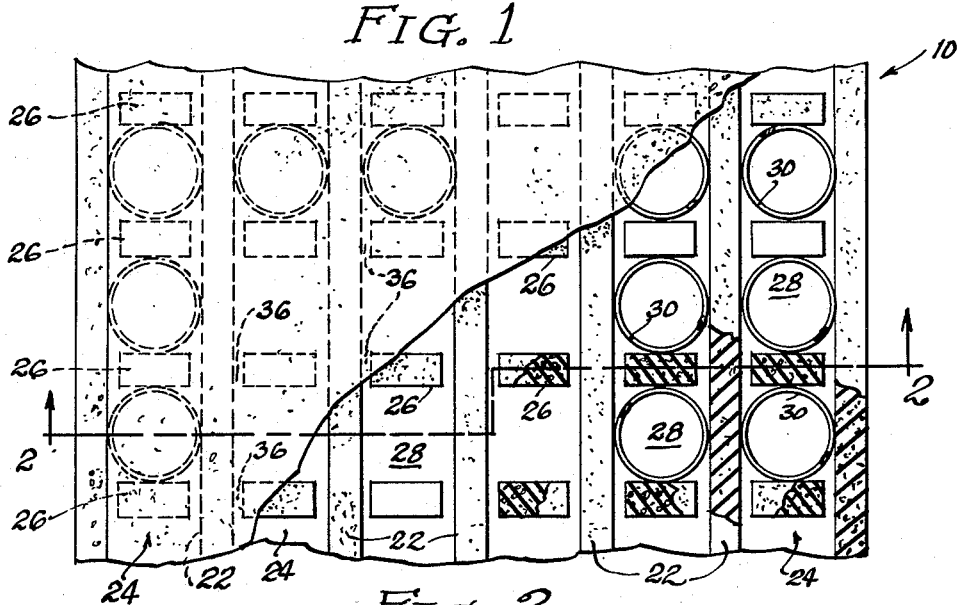
Fig. 1 is a plan view of one embodiment of this invention with a portion of the top surface of the cushion removed to show the arrangement of the compartment-forming strips and the coil springs inside.
Figure 2:
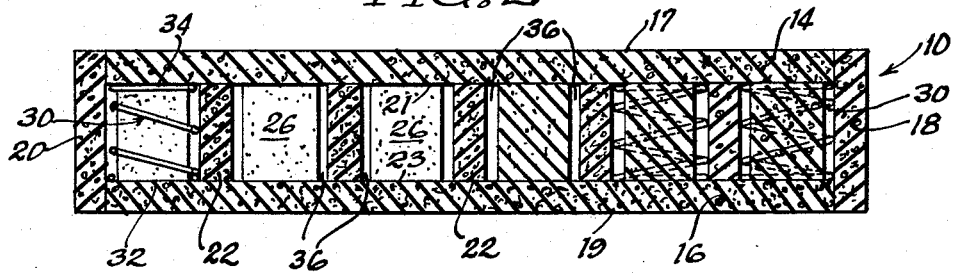
Fig. 2 is a sectional view taken on the line 2—2 of Fig. 1 and looking in the direction indicated.
Figure 3:
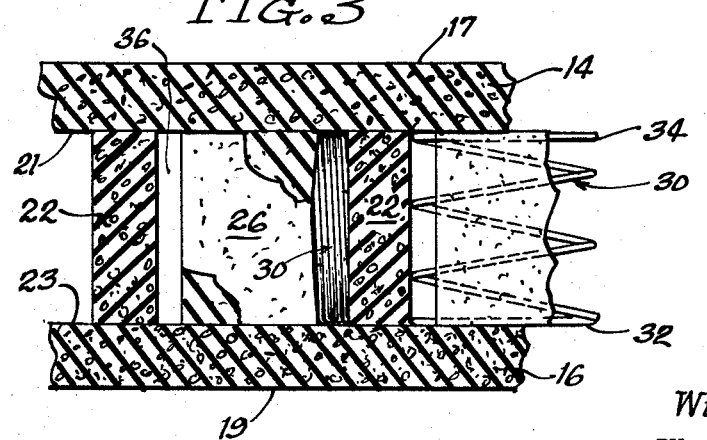
Fig. 3 is an enlarged view similar to Fig. 2, but showing a coil spring in compressed condition about to be inserted inside one of the compartments in the cushion housing.

Referring now to Figs. 1, 2, and 3, of the drawings, a cushion indicated generally by the reference numeral 10 comprises a housing formed from identical substantially rectangular sheets 14 and 16 of foam rubber or formed from some analogous material. These sheets provide the opposed load supporting and support engaging surfaces 17 and 19 of the cushion. Separate side wall sections 18 and 20, also formed from foam rubber or from some analogous material are connected to the periphery of these sheets for holding them together with their opposed surfaces 17 and 19 in spaced substantially parallel relationship to form the box shaped foam rubber housing seen in Fig. 2. As will become apparent below, the principles of this invention are not limited to the particular rectangular shapes of the foam rubber sheet material sections, or to the use of separate side walls to hold the foam rubber sections together. In that respect, it is contemplated that adjacent portions of the periphery of the sheets 14 and 16 could be connected directly together.

As seen in the drawings, the opposed surfaces of the housing are generally planar, but the principles of this invention could also apply to cushions having non-planar opposed surfaces, and the term planar or generally planar includes cushions with opposed surfaces having some curvature or which have regular variations such as corrugations.

A plurality of uniformly spaced parallel and elongated strips 22 formed from foam rubber or some other analogous material may be either integrally formed with the housing sections 14 and 16 as by molding or by corrugating the sheets, or alternatively they may be separately attached to these sections. These elongated strips extend the length of at least one dimension on the housing and are disposed in uniformly spaced parallel relationship with respect to each other thereby dividing the interior of the housing into a plurality of parallel elongated rectangular regions 24. In addition these elongated strips also help maintain the adjacent facing surfaces 21 and 23 of the housing sections 14 and 16 in spaced relationship to each other. In the example shown in Figs. 1–3, the elongated strips 22 form six regions although other numbers are contemplated, depending upon the dimensions of the coil springs to be inserted in the cushion.

A plurality of identical divider strips 26 are mounted in spaced parallel relationship to each other and are in perpendicular relationship to the elongated strips 22 in each region 24 in the housing. These divider strips 26, together with the elongated strips 22 define a column or group of square compartments 28 in each region in the housing, see Fig. 1.

A coil spring 30, circular in cross section is adapted to be mounted in each compartment. As seen in Fig. 1, the space between the facing surfaces of the elongated strips 22 and the divider strips 26 forming each compartment is equal to the diameter of the opposed ends 32 and 34 of the coil springs, so that the coil springs are held in fixed positions in the housing. It is noted, however, that the length of the dividing strips 26 is less than the width of each compartment, and that the ends of these dividing strips in each region are all aligned and spaced from either the adjacent elongated strips 22 or the peripheral flanges 18 or 20. This arrangement defines a pair of straight parallel passageways 36 connecting each compartment 28 in each column or group with each other and an opening (not shown) in the edge of the housing, see Fig. 2. The passageways are sized to permit a plurality of compressed coil springs mounted on a common support to pass them through.

To assemble the cushion, the housing is first almost completely assembled, except for openings left in the edge of the cushion which communicate with the ends of the passageways 36. Next a group of coil springs 30 are compressed and mounted on a common elongated support in a manner well known in the art, so that a plurality of coil springs can be positioned in the cushion simultaneously. This requires the spacing between the coil springs on the common support to be equal to the spacing between the compartments in the housing. Next the compressed coil springs 30 are rotated as shown in Fig. 3, and are inserted endwise in one of the passageways 36, along with their common support, (not shown). When the individual coil springs are all in alignment with their compartments, the common support and the compressed coil springs are rotated so that the ends of the coil springs are all in a horizontal plane. Next, all the coil springs are simultaneously separated from their common support and expand into resilient supporting engagement with the inner facing surfaces 21 and 23 of the housing sections 14 and 16, then the openings in the housing edge may be closed.

The modified cushion indicated generally by the reference numeral 40, comprises a housing formed from only two identical generally rectangular pieces of sheet material 42 and 44. These pieces are formed from foam rubber or some other analogous resilient flexible material, and portions of their periphery are bent over and connected together by any conventional means. It is noted that this housing construction could also be employed with the particular arrangement of compartment strips disclosed in the modification of Figs. 1–3. The chief difference between these two modifications is that the foam rubber strips in this modification are divided into two groups 46 and 48. As seen in Fig. 4, each of these groups is parallel to one of the perpendicular edges of the cushion and so they are perpendicular to each other.

The strips in group 46 are disposed in uniformly spaced end to end relation to each other along uniformly spaced parallel lines, so that they are in parallel rows. The strips in group 48, are also disposed in uniformly spaced end to end relation on uniformly spaced parallel lines and they are positioned so that both groups of strips define spaced parallel columns of square compartments 50. The compartments in this modification are similar in arrangement and form with the compartments in the modifications shown in Figs. 1–3, so that the spacing between the facing surfaces of the strips is equal to the diameter of the ends of the coil springs 52 in order to retain the coil springs in a fixed position on the housing. As seen in Fig. 4, the length of the strips is less than the diameter of the coil springs and the ends of the strips in each group are all aligned. This arrangement defines two pairs of straight passageways 54 and 56, which are perpendicular to each other and which enter each compartment 50. The advantages of this arrangement are that the coil springs can be inserted in each compartment from any side of the cushion. This is not possible in the modification disclosed in Figs. 1–3, because the passageways 36 communicate with only two opposite sides of the cushion, and consequently this additional feature eliminates time lost due to errors in constructing the modification of Figs. 1–3 caused by leaving the wrong side of the housing open. Another advantage of this modification is that since the strips are comparatively short, small pieces of foam rubber can be utilized in forming the strips which would otherwise go to waste.

The modification shown in Fig. 6 differs from the modification shown in Figs. 4 and 5, only in the form of the dividing strips. As seen, the strips 60, in this modification are generally L-shaped and are disposed in the housing so they form the same spaced parallel columns of compartments 62 which was characteristic of the two other modifications. These compartments are generally square and the L-shaped strips forming them are positioned so that their ends define two groups of perpendicular straight passageways 64 and 66. As seen, one passageway of each group extends through each of the compartments 62, as shown, so that as with the modification shown in Figs. 4 and 5, the coil springs in this modification can be inserted in the cushion housing from any peripheral side. Another important advantage of the modification of Fig. 6 over the modification disclosed in Figs. 4 and 5, is that only half as many strips have to be secured to the housing. This results in a substantial decrease in labor costs.

The invention may be embodied in other forms without departing from the spirit or essential characteristics thereof, as set forth in the claims, and the present embodiment is therefore to be considered as illustrative and not restrictive, and it is intended to include all the changes which come within the scope and range of the claims.

I claim:

1. A cushioning member, comprising a self-sufficient resilient housing formed of continuous top and bottom wall sections spaced one from the other and having a relatively thick cross-section formed of a foamed resilient cushioning material, side walls formed of the same cushioning material in a thick layer and secured at their opposite ends to the outer edge portions of the top and bottom walls, to support the top and bottom walls in their spaced relation, and to enclose the space between the said top and bottom walls, partitioning walls formed of a resilient foamed material subdividing the confined space between the top and bottom walls into a plurality of separated compartments each of which is dimensioned to receive a coil spring therein with the partitioning walls extending in one direction being of lesser length than the space between the partitioning walls extending in the opposite direction, thereby to provide an aligned space communicating the compartments in each of the rows to enable the insertion of a coil spring in a compressed state therethrough and into alignment with said compartments, and a coil spring in each compartment extending from the top to the bottom wall.

2. The apparatus set forth in claim 1, wherein said partitioning means comprise a plurality of uniformly spaced parallel and elongated strips of the said flexible resilient sheet material, extending the length of at least one dimension of the confined space, and dividing said space into a plurality of regions, a plurality of divider strips mounted in spaced parallel relation to each other in each region in the housing and disposed in perpendicular relation to said elongated strips thereby defining compartments, said dividing strips being less in length than the spacing between the adjacent elongated strips defining each region, and positioned so that their edges are aligned and are adjacent said elongated strips thereby defining a passageway of uniform width connecting the compartments with each other and adapted to connect them with an opening in the edge of the housing.

3. The apparatus set forth in claim 1 wherein said partitioning walls comprise two groups of uniformly spaced parallel partitioning walls mounted between said top and bottom walls, said first group of walls disposed in uniformly spaced end to end relationship to each other on uniformly spaced lines which are parallel to one of the side walls, so that the strips are disposed in parallel rows, said second group of partitioning walls disposed in uniformly spaced end to end relation on uniformly spaced lines parallel to another of the side walls, the walls in one group perpendicular to the walls in the other group and positioned so that both groups define spaced parallel columns of substantially rectangular compartments, each wall in each compartment spaced from the adjacent perpendicular wall and positioned so that their ends and the surface of the adjacent wall define a straight passageway of uniform width in each column connecting each compartment in the column with each other and adapted to connect them with an opening in the edge of the housing.

4. The apparatus set forth in claim 1 wherein said positioning walls are L-shaped and are disposed between said top and bottom wall so that they form a plurality of spaced parallel groups of uniformly spaced rectangular compartments, the compartments in each group extending along a straight line, the L-shaped partitioning walls defining each compartment spaced from each other so that they define two groups of straight passageways, the passageway in each group perpendicular to each other and one passageway from each group connecting every compartment in the group with each other.

5. A cushioning member as claimed in claim 1 in which the side walls and the partitioning walls are adhesively secured to the adjacent portions of the top and bottom walls to effect an assembled relationship therebetween.

References Cited in the file of this patent

UNITED STATES PATENTS

| | | |
|---|---|---|
| 1,549,521 | Suekoff | Aug. 11, 1925 |
| 1,649,832 | Krakauer | Nov. 22, 1927 |
| 1,697,819 | Krakauer | Jan. 1, 1929 |
| 2,246,775 | Marsack | Aug. 10, 1948 |

FOREIGN PATENTS

| | | |
|---|---|---|
| 407,207 | Great Britain | Mar. 15, 1934 |